United States Patent
Daun et al.

(10) Patent No.: US 10,183,464 B2
(45) Date of Patent: Jan. 22, 2019

(54) COMPOSITE ARTICLE

(71) Applicant: BASF SE, Ludwigshafen (DE)

(72) Inventors: Gregor Daun, Neckargemünd (DE); Alessio Morino, Castagneto Po (IT); Alexandre Terrenoire, Ludwigshafen (DE)

(73) Assignee: BASF SE, Ludwigshafen Am Rhein (DE)

( * ) Notice: Subject to any disclaimer, the term of this patent is extended or adjusted under 35 U.S.C. 154(b) by 0 days.

(21) Appl. No.: 15/511,815

(22) PCT Filed: Sep. 10, 2015

(86) PCT No.: PCT/EP2015/070697
§ 371 (c)(1),
(2) Date: Mar. 16, 2017

(87) PCT Pub. No.: WO2016/041836
PCT Pub. Date: Mar. 24, 2016

(65) Prior Publication Data
US 2017/0291390 A1 Oct. 12, 2017

(30) Foreign Application Priority Data

Sep. 18, 2014 (EP) .................................. 14185381

(51) Int. Cl.
| | |
|---|---|
| *B32B 5/20* | (2006.01) |
| *B32B 5/18* | (2006.01) |
| *B32B 7/02* | (2006.01) |
| *B32B 27/08* | (2006.01) |
| *B32B 27/36* | (2006.01) |
| *B32B 27/40* | (2006.01) |
| *B32B 27/06* | (2006.01) |
| *B32B 27/30* | (2006.01) |
| *B32B 27/32* | (2006.01) |
| *B32B 38/00* | (2006.01) |

(52) U.S. Cl.
CPC .................. *B32B 5/20* (2013.01); *B32B 5/18* (2013.01); *B32B 7/02* (2013.01); *B32B 27/065* (2013.01); *B32B 27/08* (2013.01); *B32B 27/302* (2013.01); *B32B 27/304* (2013.01); *B32B 27/308* (2013.01); *B32B 27/32* (2013.01); *B32B 27/36* (2013.01); *B32B 27/40* (2013.01); *B32B 38/0004* (2013.01); *B32B 2250/05* (2013.01); *B32B 2250/40* (2013.01); *B32B 2250/42* (2013.01); *B32B 2266/025* (2013.01); *B32B 2266/0221* (2013.01); *B32B 2266/0264* (2013.01); *B32B 2266/0278* (2013.01); *B32B 2266/0285* (2013.01); *B32B 2266/08* (2013.01); *B32B 2307/54* (2013.01); *B32B 2307/72* (2013.01); *B32B 2603/00* (2013.01); *B32B 2605/00* (2013.01); *B32B 2605/12* (2013.01); *B32B 2605/18* (2013.01)

(58) Field of Classification Search
CPC .......... B32B 5/20; B32B 27/08; B32B 27/36; B32B 27/32; B32B 7/02; B32B 27/065; B32B 38/0004; B32B 2603/00; B32B 2605/18; B32B 2605/12
USPC ....................................................... 428/480
See application file for complete search history.

(56) References Cited

U.S. PATENT DOCUMENTS

| | | | |
|---|---|---|---|
| 4,119,750 A | 10/1978 | Porter | |
| 4,536,427 A * | 8/1985 | Kohn ....................... | B32B 3/16 428/44 |
| 5,834,082 A * | 11/1998 | Day ....................... | B29C 44/06 428/56 |
| 2011/0091715 A1 | 4/2011 | Rakutt et al. | |
| 2011/0165363 A1 | 7/2011 | Wolf et al. | |
| 2012/0065294 A1 * | 3/2012 | Gajiwala ............... | B82Y 30/00 523/351 |

FOREIGN PATENT DOCUMENTS

| | | |
|---|---|---|
| EP | 2153982 A1 | 2/2010 |
| WO | WO-2012/016991 A1 | 2/2012 |
| WO | WO-2012058177 A1 | 5/2012 |
| WO | WO-2014161817 A1 | 10/2014 |

OTHER PUBLICATIONS

Ranade et al., Journal of Cellular Plastics, 40, 497-507, 2004.*
International Search Report for PCT/EP2015/070697 dated Dec. 14, 2015.
Written Opinion of the International Searching Authority for PCT/EP2015/070697 dated Dec. 14, 2015.

* cited by examiner

*Primary Examiner* — Hui H Chin
(74) *Attorney, Agent, or Firm* — Drinker Biddle & Reath LLP

(57) ABSTRACT

Composite article comprising at least two layers of component a) and at least one layer of component b). The layers and are alternately linked together. Component a) has a compressive modulus of at least 10 MPa in contrast to the component b), which has a compression stress value at a compression of 40% of not more than 20 kPa. Composite articles are semi-flexible materials due to alternating rigid and flexible segments within the articles. Articles optionally contain at least one additional layer of component b), which layer is also alternately linked together with the respective layers of component a). At least one layer crosses at least one layer with an angle α in the range of 0°<α<180°, wherein both layers and are made of component b). Also, a method for producing those composite articles and the use of those composite articles in composite applications.

27 Claims, 4 Drawing Sheets

Figure 3:
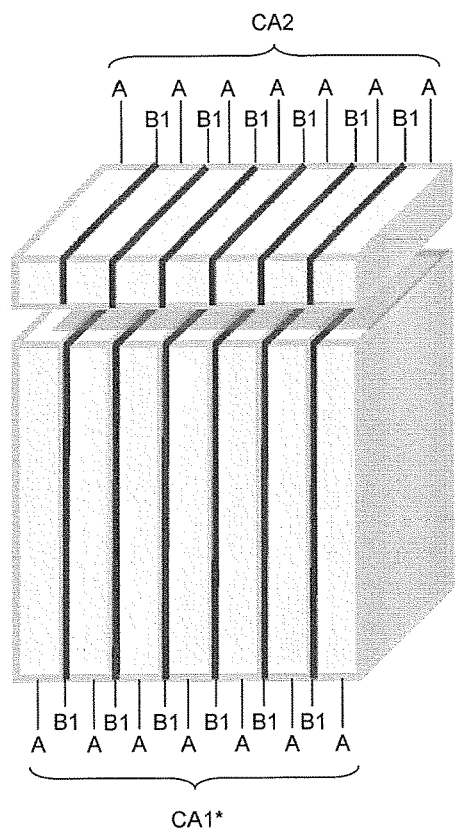

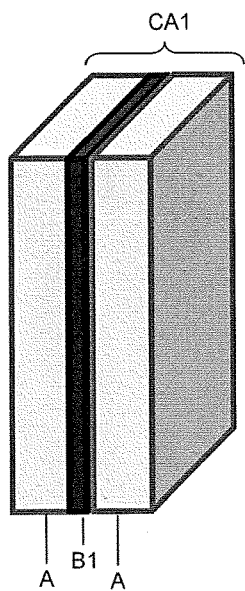
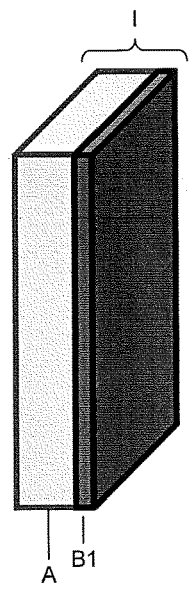
Fig. 1A                    Fig. 1B
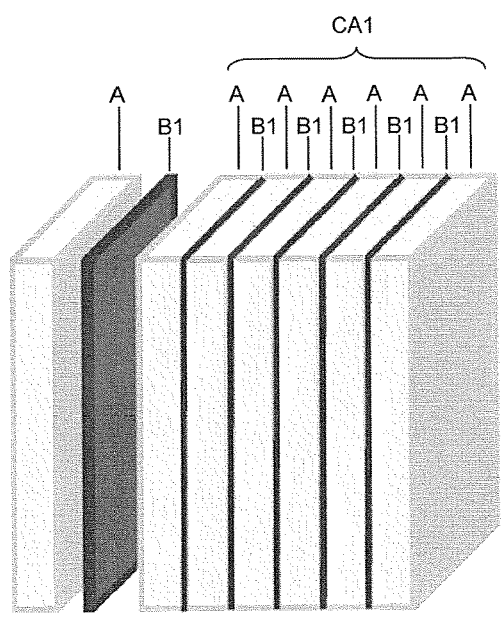
Fig. 2

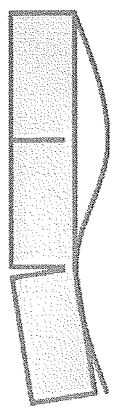 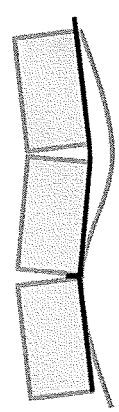  
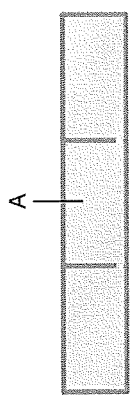 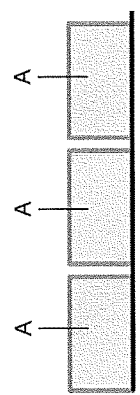 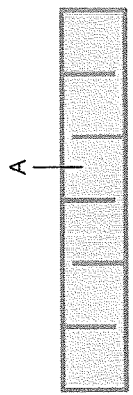 
Fig. 6A   Fig. 6B   Fig. 6C   Fig. 6D

COMPOSITE ARTICLE

CROSS-REFERENCE TO RELATED APPLICATIONS

This application is a national stage application (under 35 U.S.C. § 371) of PCT/EP2015/070697, filed Sep. 10, 2015, which claims benefit of European Application No. 14185381.2, filed Sep. 18, 2014, both of which are incorporated herein by reference in their entirety.

The present invention relates to a composite article comprising at least two layers (A) of component a) and at least one layer (B1) of component b). The respective layers (A) and (B1) are alternately linked together. The component a) has a compressive modulus of at least 10 MPa and can, therefore, be considered as a comparably rigid component, which can be also assigned as rigid core element, in contrast thereto the component b) has a compression stress value at a compression of 40% of not more than 20 kPa. By consequence, component b) can be considered as a comparably flexible (elastic) component. Therefore, the composite articles according to the present invention can be considered as semi-flexible materials due to the combination of alternating rigid and flexible segments (layers) within those composite articles. The composite articles according to the present invention may further comprise at least one layer (B2) of component b), which layer is also alternately linked together with the respective layers (A). In addition, at least one layer (B2) crosses at least one layer (B1) with an angle α in the range of 0°<α<180°, wherein both layers (B1) and (B2) are made of component b). The present invention further relates to a method for producing those composite articles as well as to the use of those composite articles in composite applications, for example, wind rotor blades or boat hulls or insulation applications, for example for curved walls or roofs or between rafters.

EP-B 2 153 982 discloses a process to combine several planar foam elements to a block by welding. Suitable foams are thermoplastic foams, e.g. polystyrene (PS), polyethylene (PE), polyvinylchloride (PVC) or polyethylene terephthalate (PET). The connection of these elements by welding is supported by the interruption of the weld seams by recesses which are spaced apart from one another. It is further shown how these foam blocks can be cut into sheet-like structural elements and how these can be incorporated in sandwich structures. However, EP-B 2 153 982 does not provide any information on the flexibility of the thermoplastic foams to be employed. Furthermore, it is preferred that the respective foam blocks are made up of only one individual thermoplastic foam.

WO 2012/058177 discloses a shaped foam laminate article and a method for manufacturing such an article. Specifically, the shaped foam laminate article comprises a first foam layer comprising a first foam, and a second foam layer comprising a second foam, wherein the first foam is different than the second foam and the first foam has a vertical compressive balance of at least 0.40 and the second foam has a vertical compressive strength equal to or greater than the vertical compressive strength of the first foam. However, WO 2012/058177 relates to two-layered foam articles only, and the two individual foam layers may be either similar or differ only slightly in respect of their performance under pressure (indicated as vertical compressive strength).

The two-layered foam articles according to WO 2012/058177 may be employed as roof files, exterior façade panels, doors, floor heating insulation panels or pipe shells. The respective articles are not differentiated into more rigid segments on the one hand and more flexible segments on the other hand.

U.S. Pat. No. 4,536,427 relates to a process for use of scrimless contourable core in laminated contoured structures. For that a first stage block of, for example balsa wood, is sawed into flat-grain panels. These panels are exclusively glued together by an adhesive with a very short elastic limit. The block made that way is sliced again by a band saw at right angle to the adhesive plane into flat-grain panels. These are glued again in the same manner as before and sliced again with a band saw. The end-grain cores obtained that way are constituted by a rectangular array of end-grain blocks which are adhesively bonded together at their adjacent edges. The material shows a certain degree of flexibility, since pressed on a contoured surface, the end-grain blocks can adjust their position once to the surface. But because the adhesive is stretched beyond its elastic limit, there is no spring-back. However, U.S. Pat. No. 4,536,427 does not provide any information in respect of the chemical composition of the adhesives employed as well as on the elastic properties of the components, which form the laminated contoured structures.

WO 2012/016991 discloses extruded polystyrene (XPS) insulation panels. Their composite XPS thermal insulation board (panels) may comprise a bottom, a central and a top XPS board having an extrusion skin at each external phase of the composite XPS board. The individual XPS boards are secured together to form the composite XPS board by thermal welds at their contact phases.

The combination of foam elements to rigid, inflexible elements by welding, gluing etc. and subsequent cutting of the intermediate foam blocks into elements of a suitable size and shape is known according prior art as discussed before. For many lightweight structures like airplane wings, wind rotor blades, boat hulls etc. the design includes sandwich structures due to their high stiffness at a comparably low weight.

Sandwich structures in this context means at least two layers of polymers, for example, fiber reinforced plastics, which enclose a core material. Core materials in structurally loaded sandwich structures are generally rigid in order to withstand tensile, shear and compressive tensions. Often these sandwich structures are not flat but need to follow the geometry of the compound, be it e.g. the aerodynamic shape of an airplane or wind rotor blade or the hydrodynamic shape of a boat hull.

In order to make the rigid material fit into a three dimensional curved shape typically rigid core materials are either cut into small cubes which are fixed to a flexible fabric or a larger panel of rigid material is slit in a way that allows the rigid material to bend while opening up the slits causing undefined properties in the gaps (slits).

These state of the art processes to flexibilize a rigid core material have two main disadvantages: The ability to follow a three-dimensional curvature is often limited due to the orientation and defined thickness and depth of the slits or the inability of the respective article/core material (fabric) to stretch. In addition the cutting of the core materials increases the surface of the core materials and together with the created gaps leads to a high consumption of liquid polymer resins.

In the dominant processes of sandwich construction according to the prior art by infusion or hand lamination the fabrics above and below the core material are filled with liquid polymer resins. At the same time the liquid polymer also saturates the surfaces of the core materials and fills the slits and gaps between the rigid elements, which in turn leads to an increased weight of the sandwich structure. This consumption of liquid polymer is detrimental because the higher weight causes additional mechanical loads especially in dynamically loaded structures like e.g. in wind rotor blades. The amount of liquid polymer which will fill the slits of the rigid material is proportional to the surface of the core material and the sum of voids caused by the original slitting technology and further voids caused by the curvature of the component.

Therefore, the object underlying the present invention is to prepare semi-flexible composite materials which can be bent in one or more directions without the need for slitting voids into the composite and with a potentially lower uptake of another liquid polymer (resin) afterwards.

The object is achieved by a composite article comprising at least two layers (A) of component a) and at least one layer (B1) of component b), wherein the respective layers (A) and (B1) of components a) and b) are alternately linked together and wherein component a) has a compressive modulus of at least 10 MPa and component b) has a compression stress value at a compression of 40% of not more than 20 kPa.

To compare both materials this compression stress value of the flexible material b) can be interpreted as a compressive modulus of not more than 50 kPa which differentiates it from the rigid material with a compressive modulus of at least 10 MPa, so two hundred times higher.

The advantages of the composite articles according to the present invention can be seen in the reduction of costs for producing those articles as well as in the reduction of their weight compared to the weight of composite articles according to the prior art, which are made by slitting voids into the respective core material. In contrast to those panels/composite materials according to the prior art, the composite articles of the present invention can significantly reduce the uptake of any resin or additional liquid polymers which otherwise can cause a tremendous increase in weight as exemplified by calculation within the experimental section of the present invention below.

The ability to follow a curvature increases with a decreasing compression stress value and optionally the tensile modulus of component b. However, it is also possible to further add a liquid polymer/liquid polymer resin to (individual layers of) the composite article of the present invention, in particular to component b). This is preferably done in case the component b) has a rather high compression stress value.

The liquid resin consumption by component b) is lowest for closed cell foams which are chemically inert against typical liquid polymer resins like polyester, vinylester, epoxy resin systems etc. By consequence, the employment of closed cell forms as component b) is another advantage for those embodiments of the present invention.

Furthermore, the composite articles according to the present invention have an increased flexibility/elasticity in at least one direction due to the presence of at least one layer (B1) made of component b), having a compression stress value at a compression of 40% of not more than 20 kPa. The flexibility may further increase in at least two directions, especially for those composite articles according to the present invention, which additionally contain (at least one) layer (B2) of component b), which layer crosses at least one layer (B1) of component b) with an angle α in the range of 0°<α<180°. This advantage/effect becomes even more apparent, in case said angle α is 90° and/or the layers (B1) and (B2) are arranged as a monitoring grid.

The improved ability of the composite articles according to the present invention to follow curvature compared to prior art panels is depicted in FIG. 6.

As it is shown in FIG. 6A or 6B, respectively, materials with thin slits on one side or individual blocks fixed without gaps to a fabric can only bend in one direction away from the slits and cannot follow e.g. an S-shaped curvature. If the curvature is three-dimensional e.g. a sphere, the array of blocks cannot follow the curvature just like a globe cannot be covered smoothly with a rectangular sheet.

Materials with thin slits on both sides as shown in FIG. 6C can follow a two-dimensional curvature but also cannot follow a three-dimensional curvature. Materials with individual blocks fixed with gaps to a fabric can follow a two-dimensional or three-dimensional curvature but that ability is limited strictly by the size of the gaps.

On the contrary the composite article (material) of the invention as shown in FIG. 6D can follow three-dimensional curvature best because the space between elements from rigid component a) is filled with an elastic component b), which can be stretched and compressed with less force.

Furthermore, the composite article can be used to insulate curved surfaces or spaces where alternative insulation materials can be squeezed or clamped in.

Insulating foams especially in housing applications are typically rigid foams. Those are difficult to use when walls or roofs are curved as in a bay or a dome. In such cases slitted rigid foams can be used but the resulting gaps are not insulating, leading to an unwanted higher heat transfer through these gaps/slits. The inventive composite articles allow for a better insulation of such structures.

Below the roof alternative insulating materials like glass wool or stone wool are often compressed sideways and clamped between rafters, where they remain. This clamping cannot work for standard rigid foams due to their high compression modulus but the composite articles of the present invention can be compressed sideways to stick between rafters.

A further advantage can be seen in the improved homogeneity of the composite articles according to the present invention. In addition, they can be used as potential stoppers for tear growth.

The present invention is specified further hereinafter,

The composite article according to the present invention comprises at least two layers (A) of component a) and at least one layer (B1) of component b), wherein the respective layers (A) and (B1) of components a) and b) are alternately linked together and wherein component a) has a compressive modulus of at least 10 MPa and component b) has a compression stress value at a compression of 40% of not more than 20 kPa.

This means that the composite article according to the present invention comprises a minimum of three layers, wherein two of the layers originate from component a) and one layer originates from component b). The three-layered composite article can be considered as the "smallest unit" of composite articles according to the present invention. Such a composite article is shown in FIG. 1A. However, the composite articles according to the present invention may comprise a plurality of individual layers (A) and (B1). FIG. 2 shows an example of such a "larger unit" of a composite article according to the present invention comprising layers (A) and (B1). There is no upper limit for the number of individual layers (A) and (B1) and optionally, as described below and depicted in (for example) FIG. 4, for the layers (B2). However, the total number of individual layers is governed by the respective layers (A) and (B1) of components a) and b) since they are alternately linked together. A plurality of individual layers may mean, for example, 2, 3, 4, 5, 10, 20, 50 or even more individual layers.

However, it is also possible that the articles according to the present invention may comprise some intermediate layers made of materials different than those of components a) or b). Such additional layers may be, for example, included into individual layer (A) or it may be placed/positioned in between a layer (A) and a layer (B1). However, it is preferred that the composite articles according to the present invention do not comprise any additional layers to layers (A) of component a), layers (B1) of component b) and optionally layers (B2) of component b).

The components a) and b), which form the respective layers (A) or (B1), respectively, differ in respect of their individual mechanical properties. Whereas component a) shows a rather high compressive modulus of at least 10 MPa, since it is a rather rigid material, component b) has a comparable low compression stress value at a compression of 40% of not more than 20 kPa, since it is a rather flexible/elastic material. Materials falling under the definition of component a) and b) according to the present invention are known to a person skilled in the art. Furthermore, a person skilled in the art knows the meaning of "compressive modulus" and "compression stress value" as such, as well as methods for measuring a compressive modulus and a compression stress value of a material. The compressive modulus of component a) and the compression stress value of component b) of the present invention are determined by DIN-norms, such norms are known to a person skilled in the art.

For component a) the compressive modulus is determined according to DIN EN ISO 844 (German version of October 2009, DIN ISO 844: 2009; total of 10 pages; in particular: item 9.4). For component b) the compression stress value at a compression of 40% is determined according to DIN EN ISO 3386-1 (German version of September 2010; total of 14 pages EN ISO 3386-1:1997+A1:2010). Both norms describe the determination of stress-strain characteristics in compression.

It is preferred that the component a) is at least one material selected from polyvinylchloride (PVC), polyethylene terephthalate (PET), polyurethane (PUR), polystyrene, a copolymer of styrene and acrylonitrile (SAN), a mixture of PVC and PUR, phenolic foams, polyimide foams, PEEK, PSU, PES-foams, FIR, PP (Neopolen P) or PS/PE-copolymer foams (E-Por), more preferably component a) is PET or a mixture of PVC and PUR, most preferably component a) is PET.

The component b) is preferably at least one polymer selected from a thermoplast, a thermoset, a crosslinked polymer and/or an at least partially closed cell foam, more preferably the component b) is polyethylene terephthalate (PET), polyurethane, polyvinylchloride, vinyl nitrile, EVA foams, PLA-foam (Ecovio), TPU foam (Infinergy), PE (Neopolen E), olefin foams (EPM, EPDM, for example Armaflex), TPEs on the basis of ether, esther, amide, olefin, like hytrel, arnitel, pebax, a polyalkylene and/or a melamine/formaldehyde condensate, the polyalkylene is preferably polyethylene (PE).

In one embodiment of the present invention the component b) is an epoxy resin.

As mentioned above, the composite articles according to the present invention may comprise a plurality of layers (B1) and the individual layers (B1) are preferably arranged in parallel, preferably the parallel arranged layers (B1) have the same distance to each other, the parallel arranged layers (B1) are all made of the same material as component b) and/or the parallel arranged layers (B1) have the same dimensions.

The form and the size (dimensions) of the individual layers (A), (B1) and, as described below, optionally (B2) may be the same or different. It is preferred that in a composite article according to the present invention, the individual layers (A) are each of the same dimension, the same holds true for the individual layers (B1) and optionally (B2). However, the size (dimensions) between an individual layer (A) on the one hand and individual layer (B1) and/or optionally layer (B2) on the other hand are preferably different, especially in one dimension (x-direction in relation to a rectangular coordinate system).

In one embodiment of the present invention, one dimension of a composite article (z-direction) is in the range of 5 to 100 mm. In case of a rectangular planar plate within this embodiment, the respective dimensions of the individual layers (A), (B1) and optionally (B2) have each the same value. Within this embodiment, the z-direction (z-dimension) is smaller than the x-direction (x-dimension) and the y-direction (y-dimension) as depicted in, for example, the composite articles CA2 within FIG. 3 as well as the composite article CA6 within FIG. 5. The respective value for the dimension in z-direction (for each layer) is made for the flat (unbended) form of the respective composite article.

It is also preferred that the individual layers (A) and (B1) are made as panels of the same size in two dimensions, whereas the third dimension of the layer (B1) is not more than 20%, preferably between 5% and 15% of the third dimension of the layer (A). More preferably the panels are rectangular planar plates. Such an embodiment of the present invention is depicted in FIG. 6B, left hand side. The respective values for the dimensions of the layers (B1) in relation to the layer (A) are made for the flat (unbended) form of the respective composite article according to the present invention.

It is even more preferred that the individual rectangular planar plates forming the layers (A) are alternately linked together via a layer (B1) in between the respective transverse sides of the individual rectangular planar plates as shown in the left hand side picture of FIG. 6D.

As mentioned above, composite articles according to the present invention may comprise at least one further layer (B2), which is also made of component b) as the layers (B1). The respective component b) within the layers (B1) on the one hand and (B2) on the other hand may be the same or different. It is preferred that component b) is the same within both types of layers (B1) and (B2). The number of individual layers (B1) and (B2) within a composite article of the present invention may be the same or different. The number of individual layers (B2) is not directly connected to the number of individual layers (A) and (B1) as shown above. The relation between the optional layer (B2) of component b) in connection with the layers (A) and (B1) in a composite article according to the present invention is as follows:

i) the respective layers (A) and (B1) of components a) and b) are alternately linked together,
ii) the respective layers (A) and (B2) of components a) and b) are alternately linked together, and
iii) at least one layer (B2) of component b) crosses at least one layer (B1) of component b) with an angle $\alpha$ in the range of $0°<\alpha<180°$.

In one embodiment of the present invention, the composite article additionally comprises a plurality of layers (B2) and the individual layers (B2) are arranged in parallel, preferably the parallel arranged layers (B2) have the same distance to each other, the parallel arranged layers (B2) are all made of the same material as component b) and/or the parallel arranged layers (B2) have the same dimensions, most preferably the layers (B1) and (B2) form a monitoring grid, wherein the angle α is 90° and/or the individual grid units have the same size and/or the parallel arranged layers (B1) as well as the parallel arranged layers (B2) are all made of the same material as component b).

The individual layers (A), (B1) and optionally (B2) can be linked together in any way known to a person skilled in the art. Such a method for linking together the individual layers can be done, for example, by welding, thermal welding, solvent welding, gluing, adhering, spraying and/or in situ foaming, preferably by thermal welding or adhering, most preferably by thermal welding. Thermal welding can be, for example, carried out as described in WO 2012/016991.

In one embodiment of the present invention, it is preferred that the components a) and b) also have a specific value for the respective tensile elongation in addition to the above mentioned values for compressive modulus and compression stress value at a compression of 40%. Tensile elongation as such as well as methods for determining parameters are known to a person skilled in the art. Tensile elongation values for components a) and b) of the present invention are determined according to the ASTM Standard Test Method C297/C297M-04 (reapproved 2010).

In one embodiment of the present invention the component a) has a tensile elongation in the range of not more than 25%, preferably in the range of 1 to 20%, more preferably of 2 to 15%, most preferably of 5 to 10%, and/or the component b) has a tensile elongation of at least 60%, preferably in the range of 80 to 5000%, most preferably of 100 to 1000%.

Another subject of the present invention is a method for producing a composite article as defined above. This method comprises the steps a) to c) as follows:
  a) one side of a first layer (A) is linked with one side of a first layer (B1) in order to obtain an intermediate (I),
  b) one side of the intermediate (I), which side originates from the first layer (B1), is linked to one side of a second layer (A) in order to obtain a composite article made of two layers (A) and one layer (B1), wherein the layers (A) and (B1) are alternately linked together,
  c) optionally linking one side of a second layer (B1) with one side of the composite article according to step b), which side of the composite article originates from a layer (A), in order to obtain a composite article made of two layers (A) and two layers (B1), wherein the layers (A) and (B1) are alternately linked together,
  wherein the step c) may be repeated at least once in order to obtain composite articles with a plurality of layers (A) and (B1) under the proviso that within each repetition of step c) either a further layer (A) or a further layer (B1) are alternately linked to one side of the respective composite article of the previous step, which side of the composite article originates from the respective other layers (A) or (B1), in order to obtain the alternate order of layers (A) and (B1) within the composite article.

Within this method, it is preferred that the individual layers (A) and/or (B1) are made as panels of the same size and the panels are rectangular planar plates, preferably the individual rectangular planar plates forming the layers (A) and (B1) are linked together via the respective largest sides of the individual rectangular planar plates.

The method according to the present invention may comprise the additional step d):
  d) the composite article (CA1) obtained according to steps a) to c) is cut in an angle α≠0° relative to the linking area of the individual layers (A) and (B1) into at least one smaller composite article (CA2).

Furthermore, the method according to the present invention may additionally comprise steps e) and optionally f):
  e) one side of the smaller composite article (CA2) is linked with one side of a first layer (B2) in order to obtain an intermediate (I2), which in turn is linked via its side originating from layer (B2) to a further composite article (CA3) in order to obtain a composite article (CA4), wherein
    i) the respective layers (A) and (B1) of components a) and b) are alternately linked together,
    ii) the respective layers (A) and (B2) of components a) and b) are alternately linked together, and
    iii) at least one layer (B2) of component b) crosses at least one layer (B1) of component b) with an angle α in the range of 0°<α<180°,
  f) optionally step e) may be repeated at least once using at least one composite article (CA2), (CA3) or (CA4) and at least one further layer (B2) in order to obtain composite articles (CA5) comprising a plurality of layers (A), (B1) and (B2).

Within the inventive method, it is preferred that the composite article (CA1) is cut in an angle α=90° and/or the further article (CA3) is identical in respect of its dimensions to the smaller composite article (CA2).

Furthermore, it is preferred that the composite article (CA4) or the composite article (CA5) obtained according to steps a) to e) and optionally f) is cut in an angle α≠0 relative to the linking area of the individual layers (A) and (B2) into at least one smaller composite article (CA6), preferably the composite articles (CA4) or (CA5) are cut in an angle α=90°.

Another subject-matter of the present invention is the use of a composite article as defined above
  A) in airplane wings, wind rotor blades, boat hulls, trains, busses, cars and other composite sandwich structures, and/or
  B) as insulation material.

The composite article is for example used as insulation material for curved walls or roofs or between rafters.

FIG. 1A shows a composite article according to the present invention, which is assigned as (CA1). The composite article (CA1) comprises two layers (A) and one layer (B1), wherein the respective layers (A) and (B1) are alternately linked together.

FIG. 1B shows an intermediate (I), which comprises only one layer (A) and only one layer (B1). Such an intermediate (I) is formed in step (a) of the method for producing a composite article according to the present invention. In order to arrive at a composite article according to the present invention, such as the composite article (CA1) as shown in FIG. 1A, the intermediate (I) as depicted in FIG. 1B has to be additionally linked with a second (further) layer (A). The linkage has to be carried out with such a side of the intermediate (I), which originates from the first layer (B1) in order to arrive at a composite article in which the respective layer (A) and (B1) are alternately linked together (alternating linking order of the respective layers).

FIG. 2 visualizes the method for producing a composite article according to the present invention, wherein the respective composite article (CA1) already comprises several individual layers (A) and (B1), which are alternately linked together. In other words, optional step c) of the method for producing a composite article according to the present invention has then been carried out several times. As it can be seen from FIG. 2, step c) of the method according to the present invention will be repeated once again in order to arrive at an even bigger composite article of the present invention comprising 7 layers (A) and 6 layers (B1), which are alternately linked together.

It has to be noted that in the context of the present invention a composite article, such as the one shown in FIG. 2, may comprise individual layers (A) and/or (B1) and/or optionally (B2), which differ in respect of the respective components a) or b). For example, the composite article as shown in FIG. 2 may comprise one or two individual layers (A), which are made of a first material falling under the definitions of component a), whereas the remaining individual layers (A) are made of a different material falling under the definition of component a). The same holds true for the respective layers (B1) and/or (B2) as shown, for example, in FIG. 4, which layers are made of material falling under the definition of component b).

In the present invention, it is preferred that the respective composite articles comprise individual layers (A) and/or (B1) and/or optionally (B2), which are made of the same material of component a) or component b), respectively. It is furthermore preferred that both layer (B1) and layer (B2) is made of the same material falling under the definition of component b).

As it can be seen from FIG. 3, the composite article (CA1) according to the present invention as shown, for example, in FIG. 2, can be cut to smaller parts. Both composite articles (CA1*) and (CA2) as shown in FIG. 3 are composite articles according to the present invention, since both composite articles (CA1*) and (CA2) comprise at least two layers (A) of component a) and at least one layer (B1) of component b), which layers (A) and (B1) are alternately linked together. The cutting as envisualized in FIG. 3 was carried out at an angle α of 90° (relative to the linking area of the individual layer (A) and (B1)).

Figure 4:
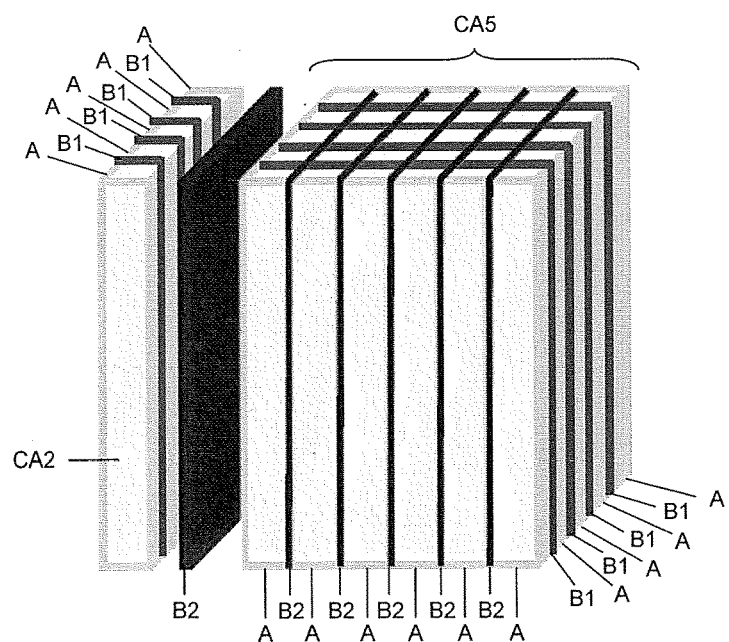

As shown in FIG. 4, the smaller composite article (CA2), the same as depicted in the upper part of FIG. 3, can be linked together—via a layer (B2) of component b)—to another composite article in order to arrive at a composite article having both layers (A) and (B1) alternately linked together, and layers (A) and (B2) alternately linked together, wherein at least one layer (B2) of component b) crosses at least one layer (B1) of component b) with an angle α in the range of 0°<α<180°. Preferably, the angle α is 90° as depicted in FIG. 4.

It has to be noted that the composite article (CA5) depicted on the right hand side of FIG. 4 does not necessarily have to be employed in connection with composite article (CA2) in order to arrive at a composite article having layers (A), (B1) and (B2). The composite layer (CA5) is already such a specific composite layer comprising layers (A), (B1) and (B2), wherein at least one layer (B2) crosses at least one layer (B1) with an angle α in the range of 0°<α<180°. Instead of the composite article (CA5) as shown on the right hand side of the embodiment according to FIG. 4, only a single (individual) layer (A) may be employed in order to arrive at (obtain) a composite article having layers (A), (B1) and (B2), wherein (at least) one layer (B2) of component b) crosses at least one layer (B1) of component b) with an angle α in the range of 0°<α<180°.

Figure 5:
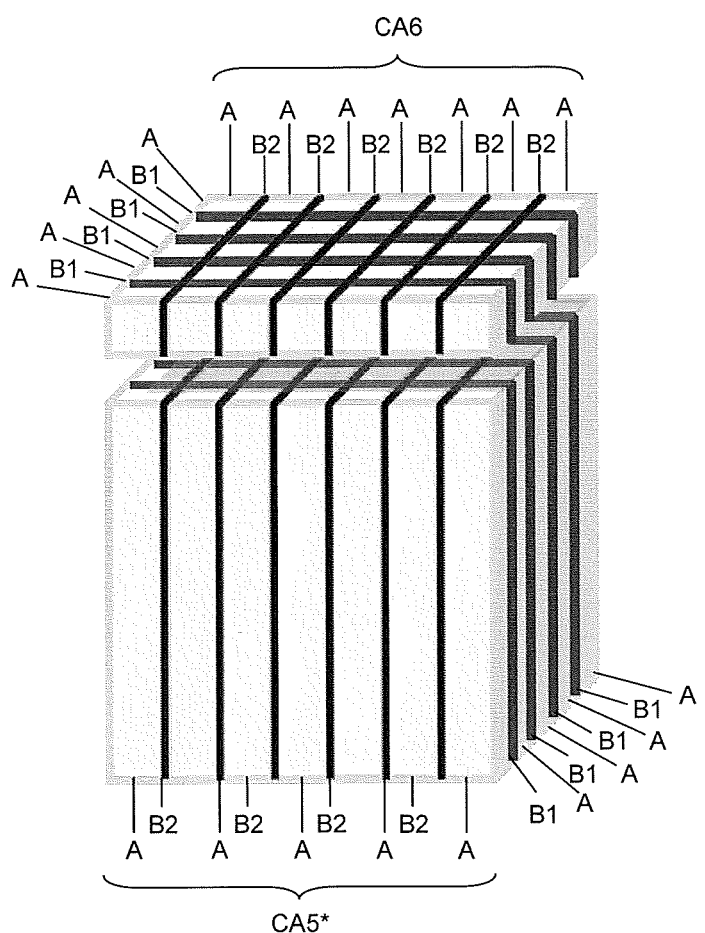

As shown in FIG. 5, such a composite article (CA5) according to the present invention may itself be cut again into smaller pieces. The composite article (CA6), as depicted in the upper part of FIG. 5, was cut out of the composite article (CA5) as obtained from FIG. 4 in an angle α=90°. The remainder of composite article (CA5) as obtained from FIG. 4 is assigned in FIG. 5 (lower part) as composite article (CA5*). Both composite articles (CA5*) and (CA6) of FIG. 5 are identical in respect of the number and chemical composition of the respective layers (A), (B1) and (B2), but the two composite articles differ in respect of their dimensions, since composite article (CA6) is smaller (in respect of the z-dimension) compared to composite article (CA5*).

FIG. 6 shows a comparison for "S-curve bending behavior" of individual panels or composite articles, respectively. FIG. 6A reveals a (one-layered) panel, which is a rectangular planar plate having slits on one side of the panel surface. The left hand side of FIG. 6A shows the respective panel in unbended (planar) form/position, whereas the right hand side reveals the S-curve bending behavior of the respective panels. As it is shown on the right hand side of FIG. 6A, the behavior in terms of both a complex two-dimensional and a complex three-dimensional draping can be considered as rather bad.

As shown in FIG. 6B, the slits on one side of the respective panel can be even broadened to obtain gaps or grooves on one side of the respective panel. The panel is not entirely cut into three equal parts, but on the lower end of the panel there is still some amount of the panel material left to combine the three parts of the upper side of this panel into one body. As it can be seen by comparing the right hand side picture of FIG. 6B with the respective right hand side picture of FIG. 6A, the S-curve bending behavior has improved a bit.

In contrast to the panel according to FIG. 6A, the respective panel according to FIG. 6C has slits on two opposing surface sides of the respective panel. Again, the left hand side picture of FIG. 6C shows the panel in planar (unbended) form, whereas the right hand side picture shows C-curve bending behavior. This behavior is improved further compared to the respective behavior of the panel with grooves on one side as shown in FIG. 6B.

However, the by far best S-curve bending behavior can be obtained with the composite articles according to the present invention as shown in FIG. 6D on the right hand side. As it is shown on the left hand side of the picture of FIG. 6D for the planar (flat/unbended) form/position of the respective composite article, the composite article contains three layers (A) of component a) and three layers (B1) of component b), wherein the respective layers (A) and (B1) are alternately linked together. FIG. 6D visualizes an embodiment of the present invention, wherein individual rectangular planar plates forming the layers (A) are alternately linked together via a layer (B1) in between the respective transverse sides of the individual rectangular planar plates of the layer (A). It is also shown in FIG. 6D (on the left hand side) that the composite articles according to this embodiment of the present invention are made of individual layers (A) and (B1) with the same size in two dimensions, whereas the third dimension of the layer (B1) is not more than 20% of the third dimension of the layer (A). The third dimension can be considered as the x-direction of a rectangular coordinate system. Due to the very flexible (highly elastic) component (B1) the individual layers (A) and (B1) are fixed together in a very stable way and the composite article as such shows a superior S-curve bending behavior in terms of both a complex two-dimensional and a complex three-dimensional draping.

The invention is illustrated hereinafter further by the examples.

The following calculations illustrate the problem of liquid polymer resin consumption in panels/composite articles according to the prior art:

Calculation for a core material with a typical thickness of 20 mm and a density of 100 kg/m³ and a typical liquid polymer density of 1000 kg/m³.

The pure core material weight is 1 m²×0.02 m×100 kg/m³=2 kg

Standard Resin Uptake at the Upper and Lower Surface +1 kg:

No slits, but resin uptake on the surface of roughly 0.5 kg/m² for both sides of the sandwich (2 m²)

Case I) 2-Dimensional Curvature (Tubular)

a) Additional resin uptake through fresh surface after 1 dimensional cutting (defined by processing tools) +1 kg:

If the rigid core material is slit in 1 dimension e.g. every 20 mm with a slit breadth of 0 mm then the additional surface created in the fifty slits will be 50×2×20 mm*1 m=2 m². This additional surface will cause an additional resin uptake of 1 kg/m².

b) Additional resin uptake in voids after 1 dimensional slitting (defined by processing tools) +1 kg:

If the rigid core material is slit in 1 dimension e.g. every 20 mm with a slit breadth of 1 mm then this volume will be filled and the weight increase of 50×0.02 m×0.001 m×1 m*1000 kg/m³=1 kg will show even if the material is lying flat.

c) Additional resin uptake in voids in tubular curvature (defined by component geometry) +0.4 kg:

If the slit material is bend in a tubular shape like e.g. the root section or the leading edge of a rotor blade then the voids caused by the slitting will open up even further due to the bending of the material. For a tubular shape where material of a thickness B and a length L is bend into a tubular shape with a much larger diameter D, then the additional void opening up has a volume share of $(Pi(\ )B*B*L)/(Pi(\ )*D*B*L)=B/D$. For a 20 mm core material in shape of a tube of 1 m diameter, the additional void percentage is 2%. This again translates into an additional weight increase of 2%*1000 kg/m³/100 kg/m³=20% or 0.4 kg out of 2 kg.

Case II) 3-Dimensional Curvature (Spherical)

a) Additional resin uptake through fresh surface after 2 dimensional cutting (defined by processing tools) +2 kg:

If the rigid core material is slit in 2 dimensions e.g. every 20 mm with a slit breadth of 0 mm then the additional surface created in the fifty slits will be (50+50)×2×20 mm*1 m=4 m². This additional surface will cause an additional resin uptake of 2 kg/m².

b) Additional resin uptake in voids after 2 dimensional slitting (defined by processing tools) +2 kg:

If the rigid core material is slit in 2 dimensions e.g. every 20 mm with a slit breadth of 1 mm then this volume will be filled and the weight increase of roughly (50+50)×0.02 m×0.001 m×1 m*1000 kg/m³=2 kg will show even if the material is lying flat.

c) Additional resin uptake in voids in spherical curvature (defined by component geometry) +1.2 kg:

If the slit material is bent in a spherical shape like e.g. the pressure dome in an airplane then the voids caused by slitting will open up even further due to the bending of the material. For a spherical shape where material of a thickness B is bend into a spherical shape with a much larger diameter D, then the additional void opening up has a volume share in relation to the core material of $(2\pi(\ ).D.B2)/(\frac{1}{3}\pi(\ )\cdot D2 \cdot B)=6 \cdot B/D$. For a 30 mm core material in shape of a sphere of 3 m diameter, the additional void percentage is 6%. This again translates into an additional weight increase of 6% 1000 kg/m³/100 kg/m³=60% or 1.2 kg of 2 kg.

The invention claimed is:

1. A composite article comprising at least two layers (A) of component a) and at least one layer (B1) of component b),
   wherein the respective layers (A) and (B1) of components a) and b) are alternately linked together and
   wherein component a) has a compressive modulus of at least 10 MPa and component b) has a compression stress value at a compression of 40% of not more than 20 kPa.

2. The composite article according to claim 1, comprising at least one further layer (B2) of component b), wherein
   i) the respective layers (A) and (B1) of components a) and b) are alternately linked together,
   ii) the respective layers (A) and (B2) of components a) and b) are alternately linked together, and
   iii) at least one layer (B2) of component b) crosses at least one layer (B1) of component b) with an angle α in the range of 0°<α<180°.

3. The composite article according to claim 1, wherein the component a) has a tensile elongation in the range of not more than 25% or the component b) has a tensile elongation of at least 60%.

4. The composite article according to claim 3, wherein the component a) has a tensile elongation in the rage of 5 to 10% or the component b) has a tensile elongation of 100 to 1000%.

5. The composite article according to claim 1, wherein the component a) is at least one material selected from polyvinylchloride (PVC), polyethylene terephthalate (PET), polyurethane (PUR), polystyrene, a copolymer of styrene and acrylonitrile (SAN), a mixture of PVC and PUR, phenolic foams, polyimide foams, PEEK, PSU, PES-foams, PIR, PP or PS/PE-copolymer foams.

6. The composite article according to claim 5, wherein component a) is PET.

7. The composite article according to claim 1, wherein the component b) is at least one polymer selected from a thermoplast, a thermoset, a crosslinked polymer or an at least partially closed cell foam.

8. The composite article according to claim 7, wherein the component b) is polyethylene terephthalate (PET), polyurethane, polyvinylchloride, vinyl nitrile, EVA foams, PLA-foam, TPU foam, PE, olefin foams (EPM, EPDM), TPEs on the basis of ether, ester, amide, olefin, a polyalkylene or a melamine/formaldehyde condensate.

9. The composite article according to claim 8, wherein the polyalkylene is polyethylene (PE).

10. The composite article according of claim 1 comprising a plurality of layers (B1) and the individual layers (B1) are arranged in parallel.

11. The composite article according to claim 10, wherein the parallel arranged layers (B1) have the same distance to each other, the parallel arranged layers (B1) are all made of the same material as component b) or the parallel arranged layers (B1) have the same dimensions.

12. The composite article according to claim 10, wherein the composite article additionally comprises a plurality of layers (B2) and the individual layers (B2) are arranged in parallel.

13. The composite article according to claim 12, wherein the parallel arranged layers (B2) have the same distance to each other, the parallel arranged layers (B2) are all made of the same material as component b) or the parallel arranged layers (B2) have the same dimensions.

14. The composite article according to claim 10, wherein the layers (B1) and (B2) form a monitoring grid, wherein the angle α is 90° or the individual grid units have the same size or the parallel arranged layers (B1) as well as the parallel arranged layers (B2) are all made of the same material as component b).

15. The composite article according to claim 1, wherein the individual layers (A), (B1) and optionally (B2) are linked together by welding, thermal welding, solvent welding, gluing, adhering, spraying or in situ foaming.

16. The composite article according to claim 1, wherein the individual layers (A) and (B1) are made as panels of the same size in two dimensions, whereas the third dimension of the layer (B1) is not more than 20% of the third dimension of the layer (A).

17. The composite article according to claim 16, wherein the panels are rectangular planar plates.

18. The composite article according to claim 16, wherein the individual rectangular planar plates forming the layers (A) are alternately linked together via a layer (B1) in between the respective transverse sides of the individual rectangular planar plates.

19. A method for producing a composite article according to claim 1 comprising:
 a) linking one side of a first layer (A) with one side of a first layer (B1) in order to obtain an intermediate (I),
 b) linking one side of the intermediate (I), which side originates from the first layer (B1), to one side of a second layer (A) in order to obtain a composite article made of two layers (A) and one layer (B1), wherein the layers (A) and (B1) are alternately linked together,
 c) optionally linking one side of a second layer (B1) with one side of the composite article according to step b), which side of the composite article originates from a layer (A), in order to obtain a composite article made of two layers (A) and two layers (B1), wherein the layers (A) and (B1) are alternately linked together, wherein the step c) is optionally repeated at least once in order to obtain composite articles with a plurality of layers (A) and (B1) under the proviso that within each repetition of step c) either a further layer (A) or a further layer (B1) are alternately linked to one side of the respective composite article of the previous step, which side of the composite article originates from the respective other layers (A) or (B1), in order to obtain the alternate order of layers (A) and (B1) within the composite article.

20. The method according to claim 19, wherein the individual layers (A) or (B1) are made as panels of the same size and the panels are rectangular planar plates.

21. The method according to claim 20, wherein the individual rectangular planar plates forming the layers (A) and (B1) are linked together via the respective largest sides of the individual rectangular planar plates.

22. The method according to claim 19 comprising the additional step d):
 d) cutting the composite article (CA1) obtained according to steps a) to c) in an angle α≠0° relative to the linking area of the individual layers (A) and (B1) into at least one smaller composite article (CA2).

23. The method according to claim 22, comprising the additional steps e) and optionally f):
 e) linking one side of the smaller composite article (CA2) with one side of a first layer (B2) in order to obtain an intermediate (I2), which in turn is linked via its side originating from layer (B2) to a further composite article (CA3) in order to obtain a composite article (CA4), wherein
  i) the respective layers (A) and (B1) of components a) and b) are alternately linked together,
  ii) the respective layers (A) and (B2) of components a) and b) are alternately linked together, and
  iii) at least one layer (B2) of component b) crosses at least one layer (B1) of component b) with an angle α in the range of 0°<α<180°,
 f) optionally repeating step e) at least once using at least one composite article (CA2), (CA3) or (CA4) and at least one further layer (B2) in order to obtain composite articles (CA5) comprising a plurality of layers (A), (B1) and (B2).

24. The method according to claim 22, wherein the composite article (CA1) is cut in an angle α=90° or the further article (CA3) is identical in respect of its dimensions to the smaller composite article (CA2).

25. The method according to claim 23, wherein the composite article (CA4) or the composite article (CA5) obtained according to steps a) to e) and optionally f) is cut in an angle α≠0° relative to the linking area of the individual layers (A) and (B2) into at least one smaller composite article (CA6).

26. The method according to claim 25, wherein the composite articles (CA4) or (CA5) are cut in an angle α=90°.

27. A method for producing
 A) airplane wings, wind rotor blades, boat hulls, trains, busses, and cars, or
 B) an insulation material
employing a composite article according to claim 1.

* * * * *